United States Patent [19]

Marinelli et al.

[11] Patent Number: 4,884,208

[45] Date of Patent: Nov. 28, 1989

[54] SYSTEM FOR CONTINUOUSLY ESTABLISHING AND INDICATING THE LOCATION OF A MOVABLE OBJECT

[75] Inventors: Orlando M. Marinelli; Mark Rector, both of Ft. Lauderdale, Fla.

[73] Assignee: Equipment Tracking Network, Inc., Ft. Lauderdale, Fla.

[21] Appl. No.: 194,597

[22] Filed: May 16, 1988

[51] Int. Cl.$^4$ ............................................. G01S 3/02
[52] U.S. Cl. ................................... 364/460; 364/449; 342/351; 340/989
[58] Field of Search ............... 364/460, 443, 449, 452, 364/459; 342/450, 451, 457; 340/910, 917, 989, 992

[56] References Cited

U.S. PATENT DOCUMENTS

| | | | |
|---|---|---|---|
| 3,419,865 | 12/1968 | Chisholm | 342/457 |
| 3,518,674 | 6/1970 | Moorehead et al. | 342/457 |
| 3,665,313 | 5/1972 | Trent | 340/287 |
| 3,680,121 | 7/1972 | Anderson et al. | 342/457 |
| 3,697,941 | 10/1972 | Christ | 340/991 |
| 3,714,650 | 1/1973 | Fuller et al. | 342/42 |
| 3,757,290 | 9/1973 | Ross et al. | 342/457 X |
| 3,848,254 | 11/1974 | Drebinger et al. | 342/457 |
| 3,864,681 | 2/1975 | Olive | 342/457 |
| 3,886,554 | 5/1975 | Braun et al. | 342/457 |
| 3,980,948 | 9/1976 | Olive | 324/83 D |
| 3,996,590 | 12/1976 | Hammack | 364/460 |
| 4,023,176 | 5/1977 | Currie et al. | 342/443 |
| 4,107,689 | 8/1978 | Jellinek | 364/450 |
| 4,152,693 | 5/1979 | Ashworth, Jr. | 364/460 |
| 4,209,787 | 6/1980 | Freeny, Jr. et al. | 342/457 |
| 4,224,596 | 9/1980 | Knickel | 364/460 |
| 4,350,969 | 9/1982 | Greer | 364/460 |
| 4,398,172 | 8/1983 | Carroll et al. | 340/942 |
| 4,596,988 | 6/1986 | Wanka | 342/457 |
| 4,651,156 | 3/1987 | Martinez | 342/457 |
| 4,651,157 | 3/1987 | Gray et al. | 342/457 |
| 4,680,590 | 7/1987 | Lowe et al. | 342/457 |

FOREIGN PATENT DOCUMENTS 2541801  8/1984  France .

Primary Examiner—Parshotam S. Lall
Assistant Examiner—Thomas G. Black
Attorney, Agent, or Firm—Panitch Schwarze Jacobs and Nadel

[57] ABSTRACT

A system for continuously establishing and indicating the location of a movable object comprises a first transmitter secured to the object for periodically transmitting, at a first predetermined frequency, first radio frequency signals representative of an identification code uniquely associated with the object. A plurality of receiver/repeater stations are positioned at spaced locations within a predetermined geographic area, each receiver/repeater station including a plurality of spaced receivers for receiving and demodulating the first radio frequency signals to provide an object identification code signal and a device associated with each first receiver for determining the strength of the received first radio frequency signal and for generating a strength signal for each receiver. Signal processor circuitry and a computer are centrally located within the predetermined geographic area in communication with the first receiver and the strength determining device for receiving the signals representative of the object identification code and the strength signals, for calculating the location of the object based upon the strength signals and for storing signals representative of the object identification code and the location of the object. A master tracking station is in communication with the signal processing circuitry and computer for each of a plurality of predetermined geographic areas. The master tracking station receives and stores the signals representative of the object identification code and the object location and provides a visual indication of the object identification code and object location.

2 Claims, 3 Drawing Sheets

SYSTEM FOR CONTINUOUSLY ESTABLISHING AND INDICATING THE LOCATION OF A MOVABLE OBJECT

BACKGROUND OF THE INVENTION

The present invention relates generally to tracking or locating systems and, more particularly, to a system for continuously establishing and indicating the location of a movable object.

In the recent past, the loss of vehicles and other movable objects as the result of theft has been increasing at an alarming rate. The problem is particularly acute with respect to certain vehicles such as construction vehicles which are very difficult to keep track of and expensive to replace. The problem is also pronounced in connection with boats, particularly expensive pleasure boats which can be easily stolen.

Various prior art devices and methods have been devised for preventing the theft of vehicles and other movable objects. The prior art devices and methods include the use of human guards and/or guard dogs, roving patrols, sophisticated alarm systems, specialized locking devices, deadman switches, and the like. While some of the prior art devices and methods are effective in deterring or curtailing the theft of such vehicles and other objects, none of the devices is completely effective. In addition, if the prior art devices or methods fail for any reason, such as a guard falling asleep on the job, an electrical surveillance device losing power or otherwise becoming inoperative, etc., there is no protection afforded to the vehicles or object. Moreover, none of these prior art devices or methods facilitates the prompt recovery of a vehicle or other object that has been stolen, despite the protective measures.

The present invention comprises a system for continuously establishing and indicating the location of a movable object, such as a construction or other vehicle, boat, etc. The present invention may be used in conjunction with any of the above-described prior art protective devices or methods or with any other such protection means. Alternatively, the present invention may be employed by itself, not only to deter the theft of the vehicle or other object, but to facilitate the prompt and efficient recovery of any such vehicle or object which has been taken. The present invention may also be employed for inventory control.

SUMMARY OF THE INVENTION

Briefly stated, the present invention comprises a system for continuously establishing and indicating the location of a movable object. The system includes a first transmitter means which is secured to the object and which periodically transmits, at a first predetermined frequency, first radio frequency signals representative of an identification code uniquely associated with the object. A plurality of receiver/repeater stations positioned within a predetermined geographic area, each includes a plurality of spaced, first receiver means for each receiving and demodulating the first radio frequency signals to provide an object identification code signal. Means are associated with each of the first receiver means for determining the strength of the received first radio frequency signals and for generating a strength signal for each first receiver means. Signal processor and computer means, centrally located within the predetermined geographic area, and communicating with the first receiver means and the strength determining means are employed for receiving the signals representative of the object identification code and the strength signals, for calculating the location of the object based upon the strength signals and for storing signals representative of the object identification code and the location of the object. A master tracking station communicates with the signal processor and computing means for each predetermined geographic area. The master tracking station includes means for receiving and storing the signals representative of the object identification code and the object location, and display means for providing a visual indication of the object identification code and the object location.

BRIEF DESCRIPTION OF THE DRAWINGS

The foregoing Summary, as well as the following detailed description of a preferred embodiment of the invention, will be better understood when read in conjunction with the appended drawings. For the purpose of illustrating the invention, there is shown in the drawings an embodiment which is presently preferred, it being understood, however, that the invention is not limited to the precise arrangement and instrumentalities shown.

In the drawings.

DESCRIPTION OF PREFERRED EMBODIMENT

Figure 1:
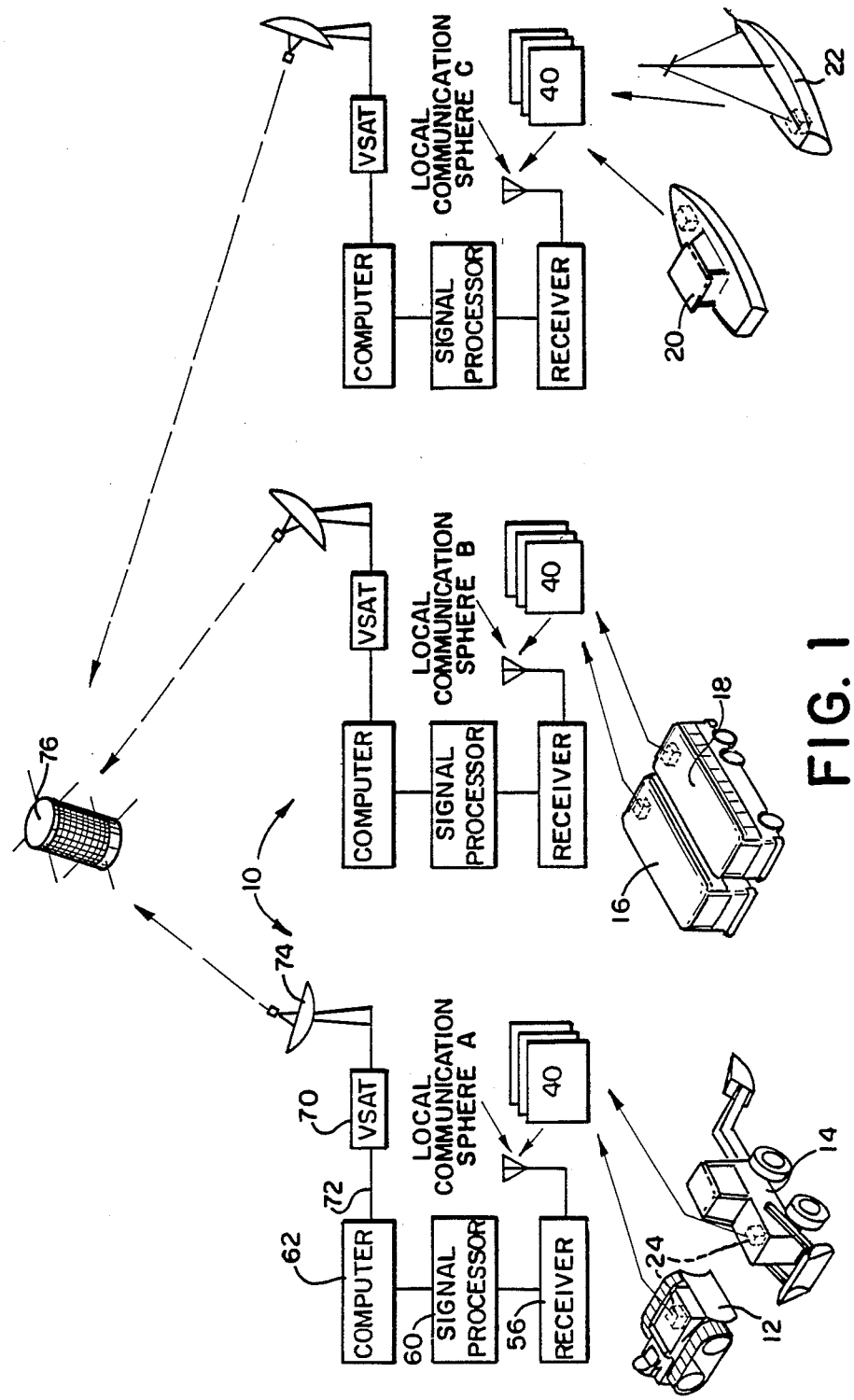
FIG. 1 is a schematic block diagram representation of a portion of a preferred embodiment of the present invention.
Figure 2:
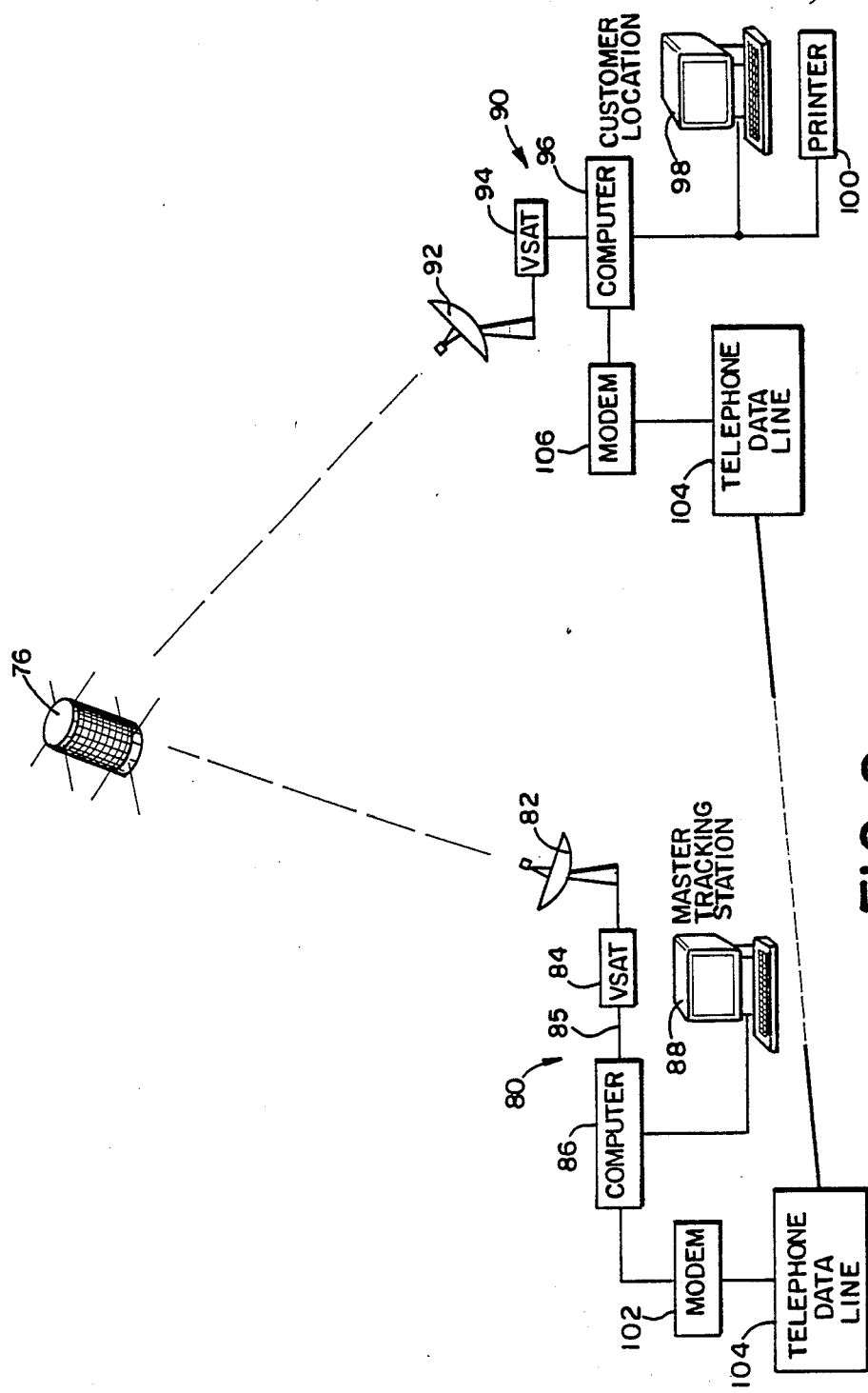
FIG. 2 is a schematic block diagram of another portion of a preferred embodiment of the present invention.

Referring to the drawings, wherein like numerals indicate like elements throughout, there is shown in FIGS. 1 and 2 a block diagram schematic representation of a system, generally 10, for continuously establishing and indicating the location of a movable object in accordance with the present invention. In the embodiment shown in FIGS. 1 and 2, the movable objects are illustrated as being construction vehicles 12 and 14, buses 16 and 18, and boats 20 and 22. However, it will be appreciated by those skilled in the art that the present invention is not limited to such vehicles and could be employed with some other type of vehicle, such as an automobile, truck, trailer, mobile home, military vehicle, air-borne vehicle or the like (not shown). Alternatively, the present invention could be employed with any other type of movable (non-vehicle) object, such as a container of the type used in containerized shipping, shipping crates or the like (not shown). In addition, the present invention could be employed with a smaller object, such as a work of art, briefcase containing valuable documents, computer, or the like (not shown). In general, it is expected that the present invention will be employed primarily with vehicles and/or other objects which may be relatively easy to move and/or difficult to locate or recover and which are generally relatively high in value and, therefore, are more likely to be stolen. However, the present invention may also be employed in conjunction with other, less valuable vehicles and/or objects, if desired. Therefore, it will be appreciated by those skilled in the art that the type of object with which the present system is employed should not be considered to be a limitation on the present invention. However, for the sake of brevity and clarity, the following discussion concerning the preferred embodiment of the invention will be limited to applications with respect to construction vehicles 12 and 14.

Figure 3:
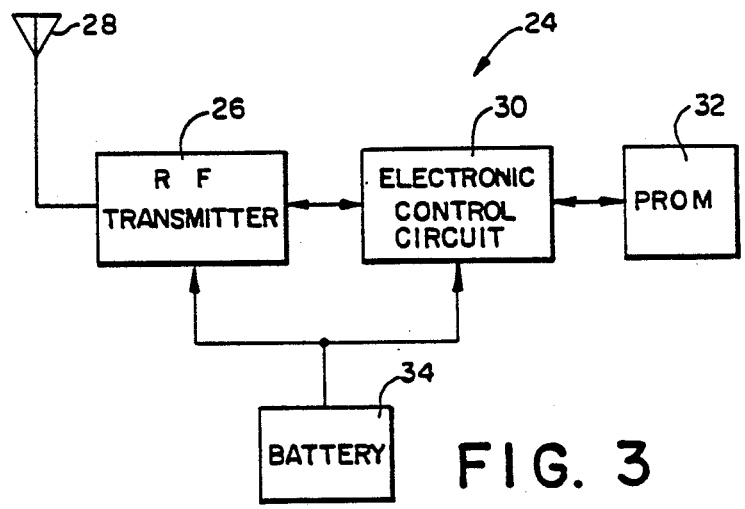
FIG. 3 is a schematic block diagram of the transmitter portion of the embodiment shown in FIG. 1.

As best shown in FIGS. 1 and 3, the system 10 is comprised of first transmitter means, shown generally as 24, secured to the object or each vehicle 12 and 14 for periodically transmitting, at a first predetermined frequency, first radio frequency signals representative of an identification code uniquely associated with each of the vehicles 12 or 14. In the presently preferred embodiment, the first transmitter means 24 is comprised of a high powered radio frequency (RF) transmitter 26, preferably of the frequency modulation (FM) type which is electrically connected to a suitable transmitting antenna 28 of a type well known in the art. The transmitter 26 is relatively small in size and is generally of a type which is well known in the art and commercially available from a variety of manufacturers, including Motorola and General Electric Co.

An electronic control circuit 30 is provided for controlling the operation of the transmitter 26. Forming a part of or electrically connected with the electronic control circuit 30 is a non-volatile memory device 32 such as a programmable read-only memory (PROM). While the present embodiment employs a PROM, the non-volatile memory device 32 could be some other memory device of a type well known in the art, such as a read-only memory (ROM); erasable, programmable read-only memory (EPROM), or the like (not shown). A power source, for example, a battery 34 is utilized to provide power to the transmitter 26 and the electronic control circuit 30 for operation of the transmitter means 24. Preferably, the battery 34 is of the long-life type, such as nickel cadmium, suitable for providing power at a desired level to both the transmitter 26 and the electronic control circuit 30 for an extended period of time and, preferably, need not be replaced more frequently than once per year. If desired, the battery 34 could be rechargeable.

The PROM 32 is programmed with an identification code uniquely associated with the vehicle 12 or 14. In the presently preferred embodiment, the unique identification code is in the form of a standard binary number or binary coded decimal number which has been permanently "burned" into the PROM 32. However, any other type of identification code or suitable means for providing a unique identification code may alternatively be employed.

The electronic control circuit 30 is of a type which is generally well known in the art and commercially available from a variety of sources, including IBM, Texas Instruments and Tandy. In operation, the electronic control circuit 30 receives an electrical signal representative of the unique identification code from the PROM 32 and applies the identification code signal to the transmitter 26. The electronic control circuit 30 also controls the timing of the transmitter 26 utilizing an internal clock (not shown) to provide for periodic transmission of the identification code signal at precisely controlled intervals on an automatic continuous basis without the need for outside initiation. The length of the periodic transmissions and the time between transmissions may be varied, but, once set, remain the same for all of the transmissions. In the presently preferred embodiment, the transmitter 26 operates only once every five minutes. Because the preferred identification code is relatively short in time, in the presently preferred embodiment the transmitter 26 transmits the identification code for a total of approximately 1/100 of a second with precise five minute intervals between each transmission. By having the transmitter 26 active for only a very short period of time with a relatively long period of time between transmissions, the power drain on the battery 34 is kept relatively small, thereby promoting extended battery life.

In addition, by having such short transmissions which are spaced apart in time, it is possible to establish and indicate the location of a substantial number of different objects within the same local area utilizing the same first radio frequency. Of course, each of the various objects (not shown) has its own unique identification code.

For example, with a transmission period of 1/100th of a second every five minutes for each transmitter means 24, and, assuming a delay of 1/100th of a second between transmissions for different objects, it would be possible to have up to 15,000 objects, each with its own unique identification code, within a local area, with the transmitters 26 for each object operating at the same first predetermined frequency. Of course, with a greater number of objects within a local area, a greater delay between transmissions or a shorter transmission time could be employed. Alternatively, the transmitter 26 for some of the objects could transmit at a different frequency than the transmission frequency used by the transmitters 26 of others of the objects.

The first transmitter means 24 is self-contained within a relatively small sized package (not shown) and is adapted to be conveniently secured to a vehicle 12 or 14 in an inconspicuous location without any modification to the vehicle. Preferably, the first transmitter means 24 includes a metallic housing (not shown) which is adapted to engage a metallic surface on the vehicle 12 or 14 so that the vehicle 12 or 14 serves as a ground plane or ground. Thus, if the first transmitter means 24 is removed from the vehicle 12 or 14, the ground connection for the first transmitter means 24 is broken, preventing further transmissions. For reasons which will hereinafter become apparent, such an unanticipated interruption in the operation of the first transmitter means 24 results in the generation of an indication signal, provoking a prompt investigation.

Figure 4:
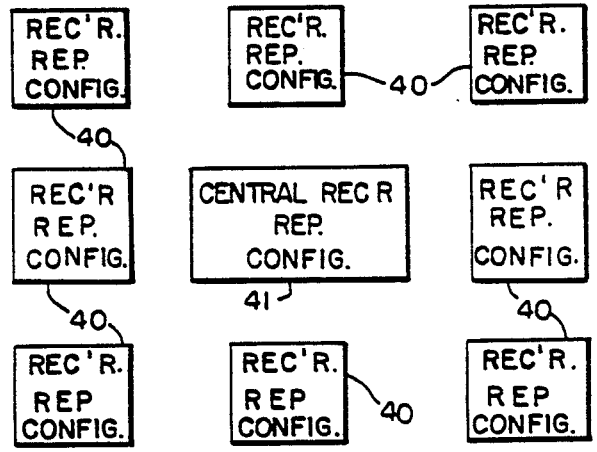
FIG. 4 is a schematic block diagram of a local communication sphere of the embodiment shown in FIG. 1.

The system 10 further comprises a plurality of receiver/repeater stations or configurations 40 at spaced locations within a predetermined geographic area. In the presently preferred embodiment, each geographic area extends for approximately ninety square miles and includes nine receiver/repeater stations 40 and 41 arranged in a predetermined pattern so that each receiver/repeater station 40 covers approximately ten square miles to provide sufficient coverage over the entire predetermined geographic area, as illustrated in FIG. 4. Each group of nine receiver/repeater stations 40 and 41 are interconnected to form a local communication sphere. In the preferred embodiment, multiple local communication spheres are employed to cover multiple geographic areas in a manner which will hereinafter become apparent. However, for the sake of clarity and brevity, only a single communication sphere for a single geographic area will be described.

Figure 5:
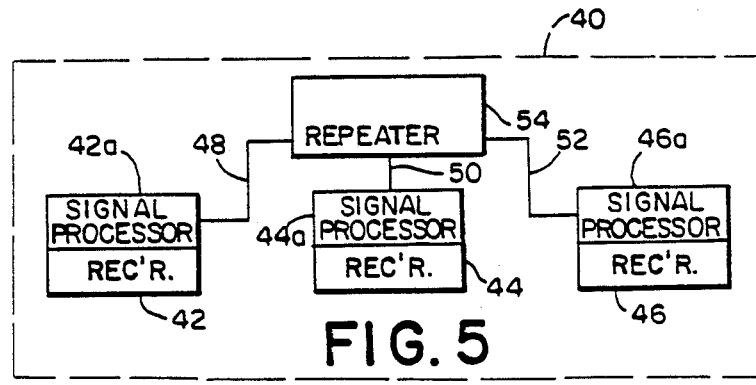
FIG. 5 is a more detailed schematic block diagram of a receiver/repeater configuration of FIG. 4.

FIG. 5 illustrates further details of a receiver/repeater station 40. The receiver/repeater station 40 shown in FIG. 5 is comprised of a plurality of spaced first receiver means for each receiving and demodulating the first radio frequency signals to provide an objection identification code signal. In the presently preferred embodiment, the plurality of first receiver means is comprised of three individual small sized receivers 42, 44 and 46, each of which is tuned or preset to receive the signals (within range) at the first predetermined frequency. In the presently preferred embodiment, the receivers 42, 44 and 46 are passive, highly sensitive, preferably battery powered, FM receivers of a type well known in the art and generally commercially available from a variety of sources, for example, Motorola, General Electric Co. or AT&T.

For reasons which will hereinafter become apparent, the receivers 42, 44 and 46 are installed at fixed locations approximately 1,000 feet apart. In the presently preferred embodiment, each receiver 42, 44 and 46 is secured to or otherwise supported by a utility pole (not shown) with the receivers each being approximately ten utility poles apart. Signal processing means 42a, 44a and 46a are associated with each receiver 42, 44 and 46 for determining the strength of each of the received first radio frequency signals for each identification code signal received and for generating a first radio frequency strength signal representative of the strength of the received first radio frequency signals for each receiver 42, 44 and 46, including suitable antenna (not shown) of a type well known in the art.

As shown in FIG. 5, each of the receivers 42, 44 and 46 is electrically connected through its associated signal processing means 42a, 44a, 46a by suitable lines, such as shielded coaxial transmission lines or cables 48, 50 and 52 to a repeater or second transmitter means 54. The second transmitter means 54 is preferably physically collocated with one of the receivers 42, 44 or 46, preferably the middle receiver 44, and, in the presently preferred embodiment, is also secured to or otherwise supported by a utility pole. The receivers 42, 44 and 46 are preferably relatively positioned in a triangular-shaped configuration but could be positioned in some other manner. The second transmitter means 54 receives the object identification code signals and the associated strength signals from each of the receivers 42, 44 and 46 and transmits, at a second predetermined radio frequency second radio frequency signals representative of the object identification code and the associated signal strengths for each of the receivers 42, 44 and 46. In the presently preferred embodiment, the second transmitter means 54 is an ultrahigh frequency (UHF) transmitter of a size similar to that of the first transmitter 26.

As previously indicated, each local communications sphere within a predetermined geographic area includes nine receiver/repeater stations, preferably positioned in a spaced, relatively regular geometric relation, as shown schematically in FIG. 4. The structure of each of the receiver/repeater stations located around the perimeter of the geographic is preferably as previously described and as shown in FIG. 5. However, the central receiver repeater/station 41, preferably generally centrally located within the geographic area, has a slightly different structure. The central receiver/repeater station 41 includes three receivers which are the same as receivers 42, 44 and 46 of each of the receiver/repeater stations 40, as described above. Like the receivers 42, 44 and 46 of receiver/repeater stations 40, the three receivers (not shown) of central receiver/repeater station 41 are similarly spaced and are tuned to receive signals at the first radio frequency. Signal processing means (not shown) are also associated with each of the three receivers of the central receiver/repeater station 41.

The central receiver/repeater station 41 does not contain a repeater 54. Instead, the central receiver/repeater station 41 includes a second receiver means, in the presently preferred embodiment, a second receiver 56 for receiving and demodulating the second radio frequency signals to provide signals representative of the object identification code and the strength signals from each of the eight receiver/repeater stations 40 in the predetermined geographic area. The second receiver 56 is preferably a highly sensitive UHF receiver tuned or preset to the second predetermined frequency to facilitate receipt of the signals from the various second transmitters or repeaters 54.

The output of the second receiver 56 is connected via a suitable electrical transmission line to signal processor means or a signal processor 60 and computer means or a computer 62 (see FIG. 1). The output signals from each of the receivers (not shown) of the central receiver/repeater stations 41 are similarly connected to the signal processor 60 and the computer 62. Preferably, both the signal processor 60 and the computer 62 are collocated with the central receiver/repeater station 41. The signal processor is of a type generally well known in the art and commercially available from a variety of sources, such as AT&T or IBM. The signal processor 60 receives the signals representative of the object identification code and the associated signal strengths with respect to each of the receivers 42, 44 and 46 associated with each of the receiver/repeater configurations 40 and the receivers of the central receiver/repeater station 41 within the local communications sphere. The signal processor 60 conditions all of the received signals and applies the signals to the input of the computer 62. In the presently preferred embodiment, the computer 62 is a microcomputer or personal computer, preferably with a hard disk having a capacity of twenty megabytes or more and a random access memory (RAM) of at least one megabyte The computer 62 also includes a 2400–9600 baud modem. Such computers are commercially available from a variety of manufacturers, including IBM. The computer 62 includes an operating system and the necessary software or programs to perform the desired calculations and data manipulation functions hereinafter described. The computer 62 receives the conditioned signals representative of the object identification code and associated strength signals and calculates the location of the object based upon the strength signals. In the presently preferred embodiment, the objection location is calculated utilizing a known technique called "algorithmic triangulation," but any other suitable technique could be used. The computer 62 then stores the object identification code signals and the location of the object in its memory, preferably on its hard disk. The location of the object is updated each time that the first transmitter 26 transmits the first RF signal and the updated location information is stored in the computer 62. When the system 10 is employed for establishing and indicating the location of multiple objects, the first transmitter means 24 secured to each object has its own unique identification code. The unique identification code signal and the associated strength signals from each of the receivers that receive the identification code signal from each first transmitter means 24 is fed to the computer 62 in the manner discussed above. The computer 62 calculates and stores the current location for each of the objects on a continuous basis. In this manner, a local computer record is maintained with respect to each such object within the predetermined geographic area. Of course, to provide for complete coverage, the above-described portion of the system 10 would be employed for each geographic area within the total area to be covered.

While the system 10, as thus far described, is sufficient for continuously establishing and indicating the location of an object within a predetermined geographic area, it is desirable to have the ability to keep track of such an object as it moves from one predetermined geographic area to another. Accordingly, information and data from the computer 62 are also transferred to a master tracking station which receives and consolidates the information, and data with respect to all such objections located anywhere within the range of any of the receivers of the system 10.

A third transmitter means or third transmitter 70 is connected to the computer 62 for receiving the signals representative of the object identification code and the object location and for transmitting at a third predetermined frequency radio frequency signals representative of the object identification code and the objection location. Preferably, the third transmitter 70 is collocated with the computer 62. In the presently preferred embodiment, the third transmitter 70 comprises a very small aperture terminal (VSAT) microwave transceiver which is linked to the computer 62 via a local area network (LAN) 72, such as an ethernet type LAN. The LAN 72 provides a high speed bisynchronous data communications link between the computer 62 and the third transmitter 70 to provide a fully interactive link for purposes which will hereinafter become apparent. The third transmitter or VSAT 70, in turn, is connected to a suitable satellite dish antenna 74 for directing transmissions to, and receiving transmissions from, a satellite 76, such as COMSAT. The VSAT is of a type which is generally well known in the art and commercially available from a variety of sources, including Harris Corp., California Microwave and MA/COM. Preferably, communication with the satellite 76 is through a time division multiple access (TDMA) of a satellite transponder but, if the demand is great enough, could require the leasing of a full transponder channel. Preferably, the VSAT 70 operates at a rate of 2400 to 9600 baud.

Referring now to FIG. 2, there is shown a schematic block diagram of the master tracking station 80. The master tracking station 80 is conveniently located, preferably at a controlled location, and is employed for receiving information from each of a plurality of predetermined geographic areas or local communications spheres located throughout a particular state, country, a particular continent, or around the world. The master tracking station 80 includes a third receiver means for receiving and demodulating the third radio frequency signals to provide signals representative of the object identification and the object location of each covered object within each local communication sphere. In the presently preferred embodiment, the third receive means comprises a satellite dish-type antenna 82, the output of which is connected to a third receiver, preferably a VSAT 84. In this manner, the master tracking station 80 can communicate with each local communication sphere via a satellite 76 in the manner previously described. The output of the VSAT 84 is connected to a computer 86 for receiving the demodulated signals representative of the object identification code and the object location, preferably the computer 86 and the VSAT 84 are interconnected by a LAN 85 of the type discussed above. The computer 86 if preferably a microcomputer or mainframe computer with sufficient capacity to process and store information on a large number of objects over a large number of geographic area. Preferably, the computer 86 includes storage means, in the presently preferred embodiment a hard disk, with a storage capacity of one gigabyte, for receiving and storing the signals representative of the object identification code and the object location. Such computers are available from several suppliers, including D.E.C. and Tandem. Display means, in this present embodiment, a standard video terminal and keyboard 88, is connected to the computer 86 for control purposes and for providing a visual indication of the object identification code and the object location for each of the covered objects throughout the entire system 10. Of course, a printer or other such hard copy device (not shown) may also be attached to the computer 86 for providing a hard copy of the object identification code and object location information stored in the computer 86.

As previously indicated, the computer 62 associated with each local communications sphere continuously tracks the location of each covered object within the corresponding predetermined geographic area. As also previously described, the object identification code and location information for each covered object is transferred to the master tracking station computer 86 where the information is also maintained. Preferably, the master tracking station computer 86 controls the transfer of the information from each of the local communications sphere computers 62 by making periodic queries via the above-described satellite communications system. The frequency of the queries may vary, depending upon the number of local communication spheres employed and the need for updating the information within the master tracking station computer 86. Preferably, the master tracking station computer 86 will be updated at least once every hour. A distributed data processing system of this type is beneficial in that if the master tracking station computer 62 becomes inoperable or suffers a catastrophic failure, no information is lost since it is all maintained at the local communications sphere computer 62.

It is also desirable to have the ability to transfer objection location information from the master tracking station 80 to a remote location, such as a customer location. In order to facilitate the transfer of such information, it is desirable that the customer location be provided with a customer station, shown generally as 90 in FIG. 2. In the presently preferred embodiment, the customer station 90 is similar to the master tracking station 80 and includes an antenna 92, VSAT 94, computer 96 and a video display and keyboard terminal 98. However, the customer station computer 96 need not have the same capacity as the master tracking station computer 86 and could be a microcomputer, such as the local communication sphere computer 62. The customer station 90 also includes a printer 100 of a type well known in the art. By providing the customer station 90 with related equipment, as described above, information from the master tracking station computer 86, may be transmitted via satellite 76 directly to the customer station 90 for storage in the customer station computer 96 and for display at the customer location, utilizing the video terminal 98 or the customer station printer 100. Of course, the information transmitted to each customer relates only to the covered objects for that particular customer. By utilizing the satellite 76 for transferring the information as described above, the customer could be at any location within the range of the satellite 76. The information within the customer computer 96 is updated periodically by the master tracking station computer 86, preferably at least once per hour. In addition, the customer could query the master tracking station computer 86 if more frequent updates are required.

FIG. 2 also illustrates an alternate manner of transferring object identification code and location information to a customer location. The alternate manner involves utilizing a modem 102 connected between the master tracking station computer 86 and a telephone data line 104 extending between the master tracking station and the customer location. Of course, a second modem 106 is installed at the customer location and is connected between the telephone data line and the customer station computer 96.

Appendix "A" sets forth a program flowchart which is an example of one manner in which the above-described preferred embodiment of the present invention could be implemented. The program flowchart of Appendix A sets forth an example of a way in which the overall system could be programmed, as well as a way in which a program could be developed to permit a query of the system. It should be appreciated by those skilled in the art that the program flowchart of Appendix "A" is merely for the purpose of providing an example and is not intended to be a limitation on the present invention.

From the foregoing description, it can be seen that the present invention comprises a system for continuously establishing and indicating the location of a movable object. It will be recognized by those skilled in the art that changes may be made to the above-described embodiment of the invention without departing from the broad inventive concepts thereof. For example, some other form of communication could be employed for transferring information and data from the local communication spheres to the master tracking station. One such possible alternate form of communication could be the use of a direct telephone data line extending from each local communication sphere to the master tracking station. In addition, other forms of communication could be employed for transferring information from the various receiver/repeater stations to the central receiver/repeater station. Again, a telephone data line could alternatively be employed for this purpose. Moreover, in relatively small geographic areas, a lesser number of receiver/repeater stations could be employed and/or the receiver/repeater stations could each contain a separate object location computer which could be in direct communication with the master tracking station. As a further alternative embodiment, for a customer having all of its objects within one particular area, the customer computer may be in direct communication with the pertinent local communication sphere computer without being linked directly to the master tracking station computer. It is understood, therefore, that this invention is not limited to the particular embodiment disclosed, but it is intended to cover any modifications which are within the scope and spirit of the invention as defined in the application.

APPENDIX "A"
PROGRAM FLOWCHART (OVERALL/QUERY)

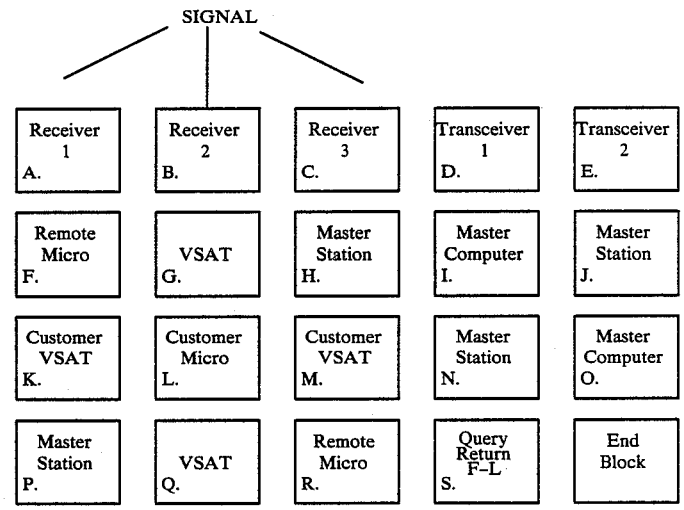

A. Signal Strength, A2 Direction, Code T2
B. Signal Strength, A2 Direction, Code T2
C. Signal Strength, A3 Direction, Code T2
D. Transceive code B1 (A1/A2/A3) to Transceiver 2
E. Transceive code B2 to Remote Micro
F. Location Value = B1(A1) B2(A2) B1(A3)/
   Triangulation Algorithm (T1)
     Save T2
     Send T1 update/Sent to VSAT
G. Transmit T2
H. Receive T2/Send to Master Computer
I. (T2) ± Previous (T2) Overlay Location Value (C2)

-continued
APPENDIX "A"
PROGRAM FLOWCHART (OVERALL/QUERY)

```
If time = X then Alarm (Movement beyond time X)
If (C2) = Y then Alarm (Movement beyond area Y)
    Save C2
    Send C2 update/Sent to Master Station
J. Transmit C2/Sent to Customer VSAT
K. Customer VSAT Receive C2/Sent to Customer Micro
L. Write C2, Time Y to Disk
QUERY
L. Query Location Value C2
    Query C2 update/Sent to Customer VSAT
M. Transmit Query C2 update
N. Receive Query C2 update/Send to Master Computer
O. C2 = T2, Find T2 Query
    Send T2 Query/Query sent to VSAT
P. Transmit T2 Query/Query sent to VSAT
Q. Transceive T2 Query/Send to Micro
R. Find Last T2
S. Query Return F-L
```

We claim:

1. A system for continuously establishing and indicating the location of a movable object comprising:

first transmitter means secured to the object for periodically transmitting, at a first predetermined frequency, first radio frequency signals representative of an identification code uniquely associated with the object;

a plurality of receiver/repeater stations positioned at spaced locations within a predetermined geographic area, each receiver/repeater station including, a plurality of spaced, first receiver means for each receiving and demodulating the first radio frequency signals to provide an object identification code signal, means associated with each first receiver means for determining the strength of the received first radio frequency signals and for generating a first radio signal frequency strength signal in each first receiver means, and second transmitter means connected to each of the spaced first receiver means and to the signal strength determining means for transmitting, at a second predetermined frequency, second radio frequency signals representative of the object identification code and the strength signals;

second receiver means centrally located within the predetermined geographic area for receiving and demodulating the second radio frequency signals to provide signals representative of the object identification code and the strength signals;

signal processor and computer means connected to the second receiver means for receiving the signals representative of the object identification code and strength signals, for calculating the location of the object based upon the strength signals, and for storing signals representative of the object identification code and the location of the object;

third transmitter means connected to the signal processor and computer means for receiving the signals representative of the object identification code and the object location and for transmitting, at a third predetermined frequency, third radio frequency signals representative of the object identification code and the object location; and a master tracking station for receiving information from a plurality of predetermined geographic areas including, third receiver means for receiving and demodulating the third radio frequency signals to provide signals representative of the object identification code and the object location, storage means connected to the third receiver means for receiving and storing the signals representative of the object identification code and the object location, and display means for receiving the stored object identification code and object location signals and for providing a visual indication of the object identification code and the object location.

2. A system for continuously establishing and indicating the location of a movable object comprising:

first transmitter means secured to the object for periodically transmitting, at a first predetermined frequency, first radio frequency signals representative of an identification code uniquely associated with the object;

a plurality of receiver/repeater stations positioned at spaced locations within a predetermined geographic area, each receiver/repeater station including, a plurality of spaced, first receiver means for each receiving and demodulating the first radio frequency signals to provide an object identification code signal, means associated with each first receiver means for determining the strength of the received first radio frequency signals and for generating a first radio frequency strength signal in each first receiver means;

signal processor and computer means centrally located within the predetermined geographic area and communicating with the first receiver means and the strength determining means for receiving the signals representative of the object identification code and strength signals, for calculating the location of the object based upon the strength signals and for storing signals representative of the object identification code and the location of the object; and a master tracking station communicating with the signal processor and computer means for each of a plurality of predetermined geographic areas, the master tracking station including means for receiving and storing the signals representative of the object identification code and the object location, and display means for providing a visual indication of the object identification code and the object location.

* * * * *